April 20, 1954  G. R. KENNEDY  2,675,934
STRADDLE TRUCK CARRIER FOR CONCRETE BLOCKS
Filed Aug. 3, 1951  2 Sheets-Sheet 1
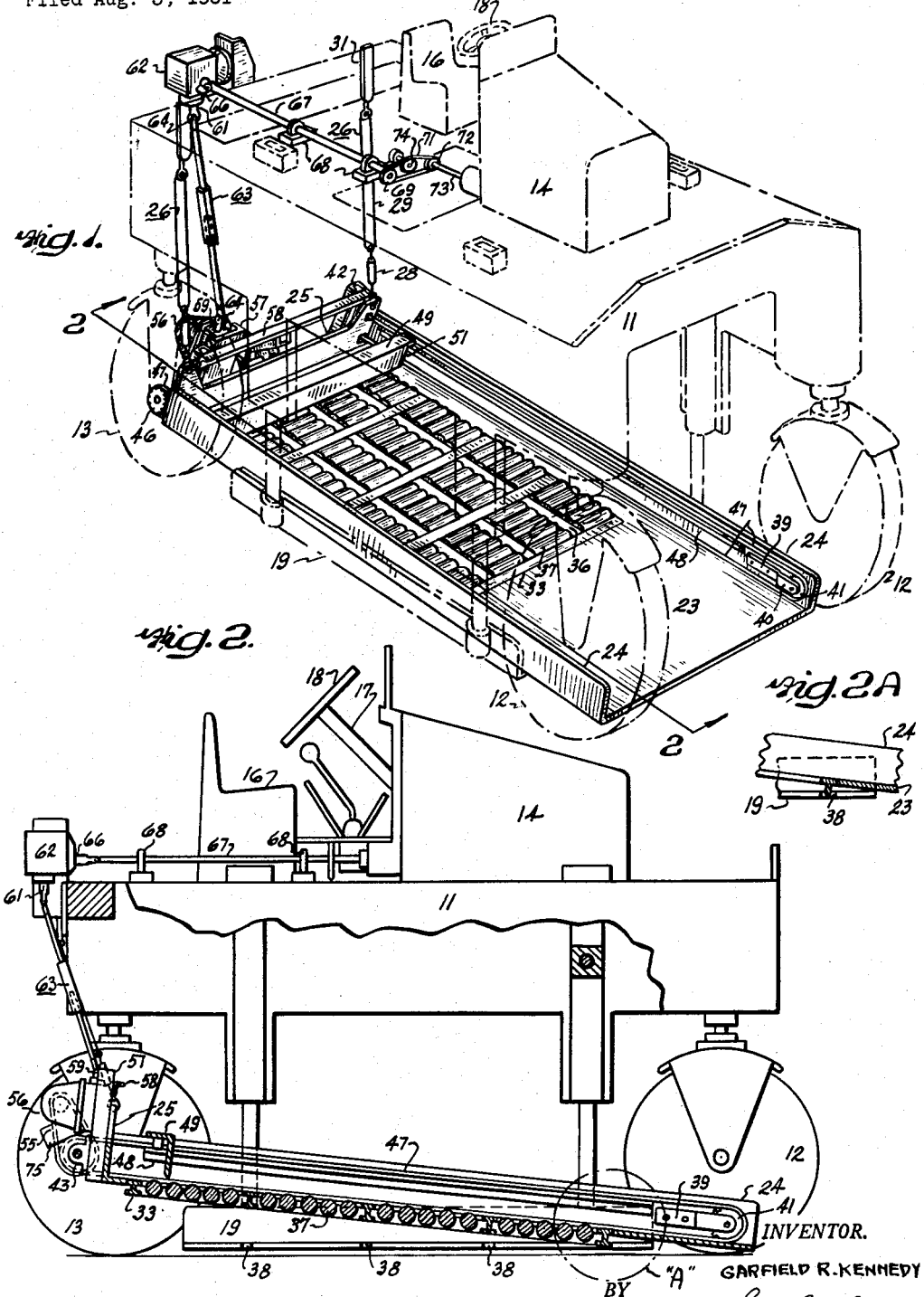
INVENTOR.
GARFIELD R. KENNEDY
BY
ATTORNEY

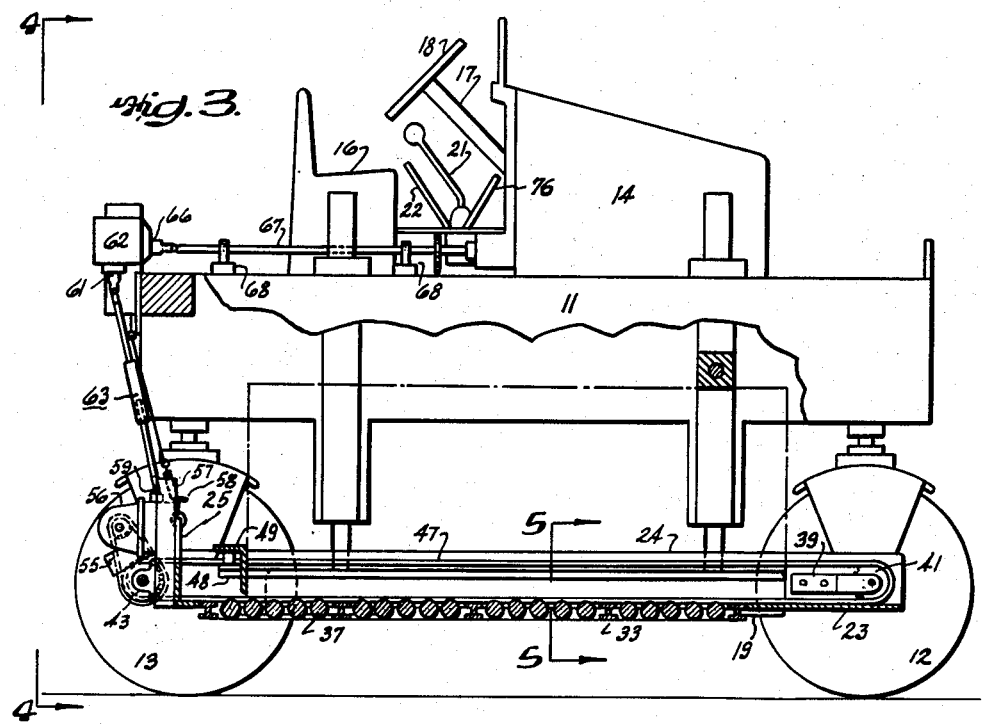

Patented Apr. 20, 1954

2,675,934

UNITED STATES PATENT OFFICE 2,675,934

STRADDLE TRUCK CARRIER FOR CONCRETE BLOCKS

Garfield R. Kennedy, Philadelphia, Pa., assignor of fifty per cent to Samuel Fertik, Philadelphia, Pa.

Application August 3, 1951, Serial No. 240,195

11 Claims. (Cl. 214—505)

1

This invention relates generally to mobile carriers of the type commonly used in transporting piles of lumber, hereinafter called a lumber carrier or simply a carrier, and is more particularly concerned with a construction which makes it possible to utilize a lumber carrier in handling certain other types of material.

A lumber carrier generally is a motor driven, straddle frame hoisting truck adapted to pick up a load piled on bolsters, and to drop the load as a unit. However, certain types of material, such as bricks and concrete blocks, are not suitable for handling in this manner. Firstly, they cannot be piled on bolsters like lumber for being picked up as a unit, and secondly, it is usually desired to distribute the load between various locations instead of dropping it as a unit.

Accordingly, an object of the present invention is to mount a platform on a lumber carrier for swinging movement thereof between a horizontal transport position and an inclined unloading position.

Another object of this invention is to provide a platform mounted thus with means for pushing the load or any selected portion thereof off one end.

Still another object of this invention is to provide a platform mounted thus with means for pushing the load or any selected portion thereof off one end, and with additional means acting to reduce sliding friction between the load and platform to a minimum.

And still another object of this invention is to provide a platform mounted thus with power driven means for pushing the load off one end, said means being controlled by the operator seated at his station on the carrier.

The construction and operation of apparatus incorporating the invention will become readily apparent as the disclosure progresses and points out additional objects and advantages considered of special importance. And, accordingly, the present invention may be considered as comprising the various features of construction and/or combination hereinafter more fully set forth in the detailed description and appended claims, reference being had to the accompanying drawings, in which:

Fig. 1 is a perspective view of an apparatus embodying the invention, the carrier being shown in broken lines;

Fig. 2 is a sectional elevation on line 2—2 of Fig. 1;

Fig. 2A is a view of the area encircled in Fig. 2 and designated "A," with parts omitted for the sake of clarity;

2

Fig. 3 is similar to Fig. 2 but shows the loading platform in transport position;

Fig. 4 is a rear elevation on line 4—4 of Fig. 3;

Fig. 5 is a section on line 5—5 of Fig. 3;

Fig. 6 is a bottom view on line 6—6 of Fig. 7;

Fig. 7 is a section on line 7—7 of Fig. 5; and

Fig. 8 is a section on line 8—8 of Fig. 4.

Referring particularly to Fig. 1, it will be seen that the carrier element of the combination includes a frame 11 whose front end is supported on a pair of ground engaging wheels 12—12 and whose rear end is supported on a pair of ground engaging wheels 13—13. The frame is arched as best shown in Figs. 1 and 4 to provide a raised portion disposed centrally longitudinally thereof and affording a high ground clearance thereunder. The arched portion of frame 11 mounts means for propelling the carrier comprising a power unit 14 drivingly connected in a conventional manner with certain of the aforementioned ground engaging wheels. An operator's seat or station 16 is also mounted on the arched portion of frame 11. The steering mechanism includes a rearwardly extending shaft 17 and a steering wheel 18, which is disposed within easy reach of an operator seated at his station. A pair of hoisting members or lifting angles 19—19 conventionally depend from opposite sides of frame 11 and are suitably actuated preferably by fluid-pressure units as shown, for vertical adjustment relative thereto, and it is to be understood that the carrier is also provided with the usual operator actuated controls of which only gear shift lever 21 and hoist or lifting angle control lever 22 are shown.

The loading platform comprises a sheet metal member 23 having raised parallel side flanges 24—24 extending the full length thereof. A plate 25 is rigidly secured, as by welding, to a rear end portion of platform member 23 and is disposed thereby to extend in a generally vertical transverse plane between flanges 24—24. The rear end of platform 23 is supported from frame 11 by a pair of similar devices 26—26. Each device comprises a ring 27 engaging an opening formed in an end portion of plate 25, a turnbuckle 28 provided with eyes at opposite ends thereof and having one end connected to ring 27, and a cable 29 engaging the other end of turnbuckle 28 and extending generally vertically for engaging a hanger 31 secured to frame 11 in any known manner. It will be understood that hangers 31 are generally transversely aligned, and that turnbuckle 28 may be adjusted for similarly aligning rings 27.

32 is a frame comprising longitudinally spaced members 33—33, transversely spaced members 34—34 and 36—36, and rollers 37—37. Members 33 are rolled I-beam sections, members 34 are roller channel sections disposed along the sides of frame 32 between members 33 and in longitudinal alignment with one another, and each member 36 is a pair of rolled channel sections toed toward one another and disposed between members 33 in longitudinal alignment with one another, thus dividing frame 32 into panels which receive rollers 37. Members 33, 34 and 36 are welded together to form a rigid frame 32 and rollers 37 are journalled in members 34 and 36, as best shown in Fig. 5. The entire frame 32 is secured, as by welding, to the portion of platform 23 which bounds an opening formed therein for receiving frame 32, the top of rollers 37 being disposed thereby to project slightly above the top surface of platform 23.

Referring particularly to Figures 3 and 5, it will be seen that in the transport position shown, platform 23 is carried by lifting angles 19, and the bottom of frame 32 extends below the bottom of lifting angles 19. Consequently, the opposite end portions of members 33, which extend across the entire bottom of platform 23, are arranged to fit into cuts 38—38 formed in angles 19 in order to afford direct bearing of platform 23 on angles 19, and it will be understood that members 34 are set back from angles 19 for the same purpose.

The platform carries a pusher device comprising a pair of endless chain and sprocket mechanisms and a pusher. Each mechanism includes a strap 39 rigidly connected at one end to a flange 24, which is offset, as at 40, for mounting a head sprocket 41 between the offset portion 40 and the laterally spaced inner side of flange 24 for rotation of the sprocket about a transverse axis. A pair of channel members 42—42 are rigidly secured to the back of plate 25 and are disposed thereby in an upright position on opposite sides of platform 23 with their toes facing forwardly. A pair of bearings 43—43 are secured to the backs of channels 42 and are disposed thereby in transverse alignment for receiving the opposite end portions of a tail shaft 44, which overhangs bearings 43 at both ends. Each overhanging end portion of shaft 44 mounts a sprocket 46 for rotation therewith, the sprocket being longitudinally aligned with the sprocket 41 on the same side of the carrier. A chain 47 is trained over sprockets 41 and 46, the upper and lower runs thereof passing through openings formed in plate 25 and being supported, respectively, by a horizontal guide angle 48 rigidly secured to the laterally inner side of flange 24 and disposed thereby to engage the underside of the upper run, and the top surface of platform 23, as best shown in Figs. 5 and 7. A pusher angle 49 has opposite end portions connected to opposed portions of the upper run of chain 47 and is disposed thereby generally transversely relative to the longitudinal axis of platform 23, the depending leg of angle 49 being cut out as at 51—51 to clear guide angles 48.

The means connecting the pusher device with power unit 14 of the carrier comprises a train of parts mounted on frame 11, a train of parts mounted on platform 23 and a member connecting the aforementioned trains of parts. A sprocket 52 mounted on shaft 44 for rotation therewith between bearings 43 is aligned with another sprocket 53 mounted on the output shaft 54 of a set of gears housed in a member 56 supported by a channel 57 rigidly secured to the back of plate 25 and braced between channels 42 by an angle 58. A chain 55 is trained over sprockets 52 and 53, and the input shaft 59 of the aforementioned set of gears is connected to the output shaft 61 of another set of gears housed in a member 62 rigidly secured to the rear end of frame 11. The connecting member 63 is made of two parts which are telescopically related to one another, and which are arranged for rotation together about the longitudinal axis of the member. The opposite end portions of member 63 are provided with universal joint elements 64—64 which connect with the input and output shafts hereinabove referred to. The input shaft 66 of the set of gears housed in member 62 is connected to a shaft 67 journalled in a pair of bearings 68—68, the free end of which shaft extends beyond the forward one of bearings 68 and mounts a sprocket 69. A chain 71 is trained over sprocket 69 and another sprocket 72 mounted on power take-off shaft 73, 74 being on idler sprocket supported from a portion of frame 11. It will be understood that 75 (see Fig. 4) is merely a device for bracing the cantilevered end of output shaft 54 from tail shaft 44.

Fig. 3 shows platform 23 in horizontal transport position. In such position the opposite side portions of platform 23 bear directly on the horizontal legs of lifting angles 19. Shifting of platform 23 longitudinally relative to angles 19 is prevented by the engagements of the opposite end portions of I-beams 33 with the cut-out notches 38 in the lifting angles 19—19. By manipulating lever 22, these lifting angles 19—19 may be lowered to the position shown in Figure 2. Initial movement of the angles 19—19 from the position shown in Figure 3 to that shown in Figure 2 shifts the weight at the rear of platform 23 from lifting angles 19 to devices 26—26, which are tensioned thereby and transmit the load to frame 11. Further movement of angles 19 is followed by the front portion of platform 23, and the entire platform swings vertically about the generally transversely aligned connections of devices 26 with platform 23 to the inclined unloading position shown in Figure 2. In the inclined position just mentioned, engagement of the opposite end portions of the foremost I-beam 33 with cuts 38 in lifting angles 19 prevents longitudinal shifting of platform 23 relative to angles 19. Rollers 37 cover a large area of platform 23, however, a substantial area at the front of the platform is free of rollers so that sliding friction between the upper surface thereof and the superimposed portion of the load carried by platform 23 is enough to prevent undesired shifting of the entire load relative to the platform.

Pusher 49 is movable fore and aft and acts to shift the load carried by platform 23 forward for discharging the entire load or a selected portion thereof. Pusher 49 is actuated by chains 47, which are driven by sprockets 46 mounted on tail shaft 44. The latter is driven by sprocket 52 and chain 55, which, in turn, are driven by sprocket 53 mounted on output shaft 54 of the set of reducing gears housed in member 56. Input shaft 59 of the set of gears just mentioned is driven by connecting member 63, which is driven by output shaft 61 of the set of gears housed in member 62. Input shaft 66 of the set of gears last mentioned is driven by shaft 67, which, in turn, is driven by a sprocket 69 and chain 71, the latter being driven by a sprocket 72 mounted on take-off shaft 73. Idler 74 may be positioned to tighten chain 71. Control of the train of parts hereinabove enumerated and selective positioning of pusher 49 is afforded by proper manipulation of lever 76 within easy reach of the operator seated at his station 16.

It will be noted that shaft 44, the set of gears housed in member 56, and the chain drive therebetween are mounted for movement with platform 23. Consequently, when platform 23 swings vertically from one position to another, the position of input shaft 59 to output shaft 61 changes. To provide for this condition connecting member 63 automatically adjusts its length to the distance between shafts 59 and 61. The telescoping portions of member 63 coact to transmit torque, and since shafts 59 and 61 are not axially aligned, the free end portions of member 63 are provided with universal joint connections to the mentioned shafts.

It should be obvious now that a lumber carrier has been provided with a platform which can be swung from a horizontal transport position to an inclined unloading position, and which is equipped with means for selectively shifting the position of a load supported thereby for discharging the same from the platform, said means being controlled from the operator's stations on the carrier. And, it should be obvious that such an apparatus is suitable for handling materials such as bricks and concrete blocks, which cannot be handled like lumber because they are not suitable for piling on bolsters, and because generally it is not desired to drop the entire load at one location but to distribute the load at various places.

Although the apparatus herein disclosed as embodying the invention has particular utility in the mounting of a loading platform on a lumber carrier, certain features are of more general application and, therefor, it is not intended to limit the invention to the exact construction and combination herein shown and described for the purposes of illustration as various modifications within the scope of the appended claims may occur to persons skilled in the art.

What is claimed as new and useful is:

1. In combination with a carrier having an elongated frame comprising front and rear portions each supported on widely spaced ground engaging wheels, vertically adjustable means depending from said frame, and means for actuating said adjustable means, an elongated platform having front and rear portions and raised side flanges, said platform being disposed in underslung relation to said frame, said rear portion being carried by said frame and being mounted for vertical swinging movement of said platform, said front portion being carried by said vertically adjustable means for movement therewith, and said vertical movement of the adjustable means affording vertical swinging movement of said platform between a horizontal transport position and an inclined unloading position, and a pusher device comprising a pair of endless chain and sprocket mechanisms carried by said flanges and extending substantially the full length of said platform, said mechanisms being disposed on the laterally inner sides of said flanges in laterally opposed relation to one another, an elongated member having opposite end portions connected to laterally opposed portions of said chains for movement therewith and being disposed thereby transversely relative to the longitudinal axis of said platform, and means for actuating said mechanisms and moving said member fore and aft for urging a load carried by said platform toward the front end thereof for discharging said load or any selected portion thereof.

2. In combination with a carrier having an elongated frame comprising front and rear portions each supported on widely spaced ground engaging wheels, vertically adjustable means depending from said frame, and means for actuating said adjustable means, an elongated platform having front and rear portions and raised side flanges, said platform being disposed in underslung relation to said frame, said rear portion being carried by said frame and being mounted for vertical swinging movement of said platform, said front portion being carried by said vertically adjustable means for movement therewith, and said vertical movement of the adjustable means affording vertical swinging movement of said platform between a horizontal transport position and an inclined unloading position, and a pusher device comprising a pair of head sprockets carried by portions of said flanges at the front of said platform and disposed thereby on the laterally inner sides of said flanges, a drive shaft carried by the rear portion of the platform for rotation about a horizontal axis, a pair of tail sprockets carried by said shaft and mounted for rotation therewith, said tail sprockets being disposed thereby in longitudinal alignment with said head sprockets, a pair of endless chains trained over said head and tail sprockets and disposed thereby on opposite sides of the carrier, an elongated member having opposite end portions connected to laterally opposed portions of said chains for movement therewith and being disposed thereby transversely relative to the longitudinal axis of said platform, and means for actuating said chains and moving said member fore and aft for urging a load carried by said platform toward the front end thereof for discharging said load or any selected portion thereof.

3. In combination with a carrier having an elongated frame comprising front and rear portions each supported on widely spaced ground engaging wheels, vertically adjustable means depending from said frame, and means for actuating said adjustable means, an elongated platform having front and rear portions and being disposed in underslung relation to said frame, said rear portion being carried by said frame and being mounted for vertical swinging movement of said platform, said front portion being carried by said vertically adjustable means for movement therewith, and said vertical movement of the adjustable means affording vertical swinging movement of said platform between a horizontal transport position and an inclined unloading position, a plurality of similar elongated rollers carried by said platform and mounted to rotate freely about generally horizontal transverse axes, said rollers being disposed in close adjacent relation to one another for bridging an opening formed in said platform, and a pusher device comprising a member carried by said platform and mounted for movement fore and aft, said member acting to shift a load carried by said platform over said rollers toward the front of said platform for discharging said load or a selected portion thereof, and means for actuating said member.

4. In combination with a carrier having an elongated frame comprising front and rear portions each supported on widely spaced ground engaging wheels, vertically adjustable means depending from said frame, means for propelling said carrier and actuating said adjustable means, and an operator's station on said frame, an elongated platform having front and rear portions and being disposed in underslung relation to said frame, said rear portion being carried by said frame and being mounted for vertical swinging movement of said platform, said front portion being carried by said vertically adjustable means for movement therewith, and said vertical movement of the adjustable means affording vertical swinging movement of said platform between a horizontal transport position and an inclined unloading position, a pusher device comprising a member carried by said platform and mounted for movement fore and aft for urging a load carried by said platform toward the front thereof for discharging said load or a selected portion thereof, and means operatively connecting said pusher device and means for propelling the carrier for actuation of the former by the latter, said last mentioned means being controlled by an operator seated at his station on the carrier.

5. In combination with a carrier having an elongated frame comprising front and rear portions each supported on widely spaced ground engaging wheels, vertically adjustable means depending from said frame, means for propelling said carrier and actuating said adjustable means, and an operator's station on said frame, an elongated platform having front and rear portions and being disposed in underslung relation to said frame, said rear portion being carried by said frame and being mounted for vertical swinging movement of said platform, said front portion being carried by said vertically adjustable means for movement therewith, and said vertical movement of the adjustable means affording vertical swinging movement of said platform between a horizontal transport position and an inclined unloading position, a pusher device comprising a member carried by said platform and mounted for movement fore and aft for urging a load carried by said platform toward the front thereof for discharging said load or a selected portion thereof, and means operatively connecting said pusher device and means for propelling the carrier and comprising a first member operatively connected to said means for propelling the carrier, said first member being carried by said frame and mounted thereon for rotation about a generally vertical axis, a second member carried by said platform for movement therewith and mounted thereon for rotation about a generally vertical axis, rotatable means between said first and second members, and means operatively connecting said pusher device and second member for actuation of the former by the latter, said means operatively connecting said pusher device and means for propelling the carrier receiving power from the latter and being controlled by an operator seated at his station on the carrier.

6. In combination with a carrier having an elongated frame comprising front and rear portions each supported on widely spaced ground engaging wheels, vertically adjustable means depending from said frame, means for propelling said carrier and actuating said adjustable means, and an operator's station on said frame, an elongated platform having front and rear portions and being disposed in underslung relation to said frame, said rear portion being carried by said frame and being mounted for vertical swinging movement of said platform, said front portion being carried by said vertically adjustable means for movement therewith, and said vertical movement of the adjustable means affording vertical swinging movement of said platform between a horizontal transport position and an inclined unloading position, a pusher device comprising a member carried by said platform and mounted for movement fore and aft for urging a load carried by said platform toward the front thereof for discharging said load or a selected portion thereof, and means operatively connecting said pusher device and means for propelling the carrier and comprising a first set of gears operatively connected to said means for propelling the carrier, said first set of gears being housed in a member rigidly secured to said frame, a second set of gears housed in a member rigidly secured to said platform for movement therewith, telescopic means operatively connecting said first and second sets of gears and comprising an elongated member provided with universal connecting elements at opposite ends thereof, and means operatively connecting said pusher device and second set of gears for actuation of the former by the latter, said means operatively connecting said pusher device and means for propelling the carrier receiving power from the latter and being controlled by an operator seated at his station on the carrier.

7. In combination with a carrier having a wheeled frame and vertically adjustable elongated means suspended from said frame, tension means suspended from said frame, an elongated platform supported by said vertically adjustable and tension means in underslung relation to said frame for vertical swinging movement between transport and unloading positions under the influence of movement of said vertically adjustable means, the latter extending along said platform and having a major portion of the length of said platform when in said transport position seated thereon and having one end portion only of said platform when in said unloading position seated thereon, the other end portion of said platform being supported by said tension means.

8. In combination with a carrier having a wheeled frame and vertically adjustable means depending from said frame, a platform disposed in underslung relation to said frame and carried thereby for vertical swinging movement between transport and unloading positions under the influence of the movement of said vertically adjustable means, a plurality of anti-friction rollers carried by said platform for engaging a load supported thereby, each of said anti-friction rollers being disposed a substantial distance from the discharge end of said platform, and a pusher device comprising a member carried by said platform and mounted for movement fore and aft, said member being actuable for shifting said load over said anti-friction rollers toward said discharge end of the platform for discharging said load or a selected portion thereof.

9. In combination with a carrier having a wheeled frame and vertically adjustable means depending from said frame, a platform disposed in underslung relation to said frame and carried thereby for vertical swinging movement between transport and unloading positions under the influence of the movement of said vertically adjustable means, a plurality of anti-friction rollers carried by said platform for engaging a load supported thereby, said anti-friction rollers being disposed in side by side close relation to one another for bridging an opening formed in said platform and spaced a substantial distance from the discharge end thereof, and a pusher device comprising a member carried by said platform and mounted for movement fore and aft, said member being actuable for shifting said load over said anti-friction rollers toward said discharge end of the platform for discharging said load or a selected portion thereof.

10. In combination with a carrier having a wheeled frame, vertically adjustable means depending from said frame, means for propelling said frame and actuating said means, and an operator's station on said frame, a platform disposed in underslung relation to said frame and carried thereby for vertical swinging movement between transport and unloading positions under the influence of the movement of said vertically adjustable means, a pusher device comprising a member carried by said platform and mounted for movement fore and aft, said pusher member being positively actuable for urging a load carried by said platform toward one end thereof for discharging said load or a selected portion thereof, and means operatively connecting said pusher member and means for propelling said frame comprising a first member rotatably carried by said frame, a second member rotatably carried by said platform for movement therewith, and self-adjusting means operatively connecting said first and second members, said means operatively connecting said pusher member and means for propelling said frame being actuated by the latter and being controlled by an operator seated at said station.

11. In combination with a carrier having a wheeled frame, vertically adjustable means depending from said frame, means for propelling said frame and actuating said means, and an operator's station on said frame, a platform disposed in underslung relation to said frame and carried thereby for vertical swinging movement between transport and unloading positions under the influence of the movement of said vertically adjustable means, a pusher device comprising a member carried by said platform and mounted for movement fore and aft, said pusher member being positively actuable for urging a load carried by said platform toward one end thereof for discharging said load or a selected portion thereof, and means operatively connecting said pusher member and means for propelling said frame comprising a first member rotatably carried by said frame, a second member rotatably carried by said platform for movement therewith, and telescopic means operatively connecting said first and second members comprising an elongated member provided with universal connecting elements at opposite ends thereof, said means operatively connecting said pusher member and means for propelling said frame being actuated by the latter and being controlled by an operator seated at said station.

References Cited in the file of this patent

UNITED STATES PATENTS

| Number | Name | Date |
| --- | --- | --- |
| 136,287 | Truesdell | Feb. 25, 1873 |
| 1,180,956 | Sykes | Apr. 25, 1916 |
| 1,188,986 | Paulson | June 27, 1916 |
| 1,798,412 | Grab | Mar. 31, 1931 |
| 1,856,787 | Schellentrager et al. | May 3, 1932 |
| 2,208,208 | Brooks | July 16, 1940 |
| 2,321,198 | Graves | June 8, 1943 |
| 2,379,982 | Mitchell | July 10, 1945 |
| 2,388,458 | Alfonte | Nov. 6, 1945 |
| 2,410,965 | Dimick | Nov. 12, 1946 |
| 2,512,339 | Knapp, Jr. | June 20, 1950 |
| 2,557,203 | Rehberger | June 19, 1951 |
| 2,573,206 | Lee et al. | Oct. 30, 1951 |
| 2,576,345 | Jacob | Nov. 27, 1951 |
| 2,603,369 | Soderstrom | July 15, 1952 |